United States Patent [19]
Hirose

[11] Patent Number: 4,549,357
[45] Date of Patent: Oct. 29, 1985

[54] GOLF CLUB ADJUSTER

[76] Inventor: Akio Hirose, 3-31-7 Sanda-cho, Hachioji-City, Tokyo, Japan

[21] Appl. No.: 572,557

[22] Filed: Jan. 20, 1984

[30] Foreign Application Priority Data

Jun. 3, 1983 [JP] Japan .............................. 58-097966

[51] Int. Cl.$^4$ .............................................. G01B 5/24
[52] U.S. Cl. ........................................ 33/508; 72/293
[58] Field of Search ................ 33/174 F; 72/293, 316; 273/32 R, 32 B, 162 F

[56] References Cited

U.S. PATENT DOCUMENTS

| 2,973,581 | 3/1961 | Rhodehamel | 33/174 F |
| 3,439,429 | 4/1969 | Sundstrom | 33/174 F |
| 3,822,477 | 7/1974 | Collins | 33/174 F |
| 4,094,072 | 6/1978 | Erb | 33/174 F |
| 4,245,391 | 1/1981 | Heller | 33/174 F |
| 4,245,392 | 1/1981 | Heller | 33/174 F |

Primary Examiner—Richard R. Stearns
Attorney, Agent, or Firm—Charles H. Thomas

[57] ABSTRACT

A golf club adjuster employs a base within which the head of a golf club is immobilized for purposes of adjusting the lie and loft angles of the club. The surface of the base which contacts the sole of the golf club head is inclined relative to the horizontal at an angle of between about 20° and about 40°. The surface of the base which contacts the face of the golf club head is inclined relative to the vertical at an angle of between about 5° and about 30°. When a golf club head is immobilized in a base having such a configuration the neck of the club can be twisted, for adjustment as necessary, to properly define a fulcrum so as to impart spin to a golf ball struck by a player who uses an oval swing.

6 Claims, 4 Drawing Figures

GOLF CLUB ADJUSTER

BACKGROUND OF THE INVENTION

1. Field of the Invention

The present invention relates to devices for adjusting the lie and loft angles of golf clubs.

2. Description of the Prior Art

Various golf club adjusting devices are presently available for adjusting the lie and loft angles of a golf club. A typical, conventional golf club adjuster employs a base having a slot or channel within which a golf club head is immobilized so that the neck of the club may be twisted to effectuate adjustments. In conventional golf club adjusters the surface of the slot or channel which contacts the sole of the golf club head is a surface having an upward inclination relative to the horizontal at an angle of from 30° to 35°. The surface of the channel of the golf club adjuster which resides in contact with the face of the golf club is an upright vertical surface.

The configuration of the immobilizing surfaces in a conventional golf club adjuster is selected based on the assumption that the club will be used in a so called "point" or circular swing. That is, the presumption is made that the golf club will be swung in a circular arc. Contact with the golf ball is theoretically at a single "point" at which the ball is propelled by repulsion, or the direct transfer of momentum from the club head through the center of the ball.

All conventional golf club adjusters are manufactured to adjust the loft and lie angle so as to make the "point" swing easier. In the case of the "point" or circle swing, the distance of golf ball travel is determined by the club head speed, and the direction is determined by the angle of the club face. In this case it is sufficient to adjust the loft and lie angles so that the appropriate golf club head speed and the club face angle can be defined, since the head speed and face angle at the point of impact are critical.

SUMMARY OF THE INVENTION

The design of conventional golf club adjusters fails to take into consideration the advantages of an oval or "line" swing. By way of analogy, a bullet which is shot from a rifle uses the air to minimize loss of energy because a spin is imparted to the bullet when it passes through the rifling on the interior of the rifle barrel. On the other hand, a bullet shot from a pistol cannot use the air to minimize loss of energy because it does not have a spin which rifling can produce. Therefore, the rifle shot is superior both in distance and direction as compared with a pistol shot with the same amount of powder.

Similarly, in order to impart the same spin to a golf ball, a "line" swing or oval swing is employed. That is, the golfer swings the club head so that it travels in an oval shaped path, rather than in a circular path. For the "line" swing, then, it is necessary to define a fulcrum which is the central point of distance (depth-horizontal), height (depth-vertical), and direction (left or right). The fulcrum must be properly defined on the face of the club head.

All conventional golf club adjusters have been manufactured to adjust the loft and lie angles so as to make the "point" swing easier. Therefore, these adjusters cannot give a fulcrum to the club face. As a consequence, the clubs adjusted by these conventional adjusters are not appropriate for use with a "line" swing which would produce an ideal spin.

The new golf club adjuster according to the invention represents an improvement over prior art golf club adjusters so as to remedy the foregoing deficiency. The golf club adjuster of the present invention has an inclined sole contact face on the sole contact part of the adjuster base with an inclination relative to the horizontal of between about 20° and about 40°. The sole contact surface intersects the face contact surface in a line so that the sole and face contact surfaces form a dihedral, and the line at the intersection of the surfaces also resides at an angle of between about 20° and 40° relative to the horizontal. The face contact surface of the golf club adjuster of the invention is inclined relative to the vertical at an angle of between about 5° and 30°.

With the golf club adjuster of the invention, a golf club may be provided with a fulcrum on the face of the club so as to facilitate an easier "line" or oval swing. The fulcrum becomes the central point of power which produces distance, height and direction.

The invention may be described with greater clarity and particularity by reference to the accompanying drawings.

DESCRIPTION OF THE EMBODIMENT

Figure 1:
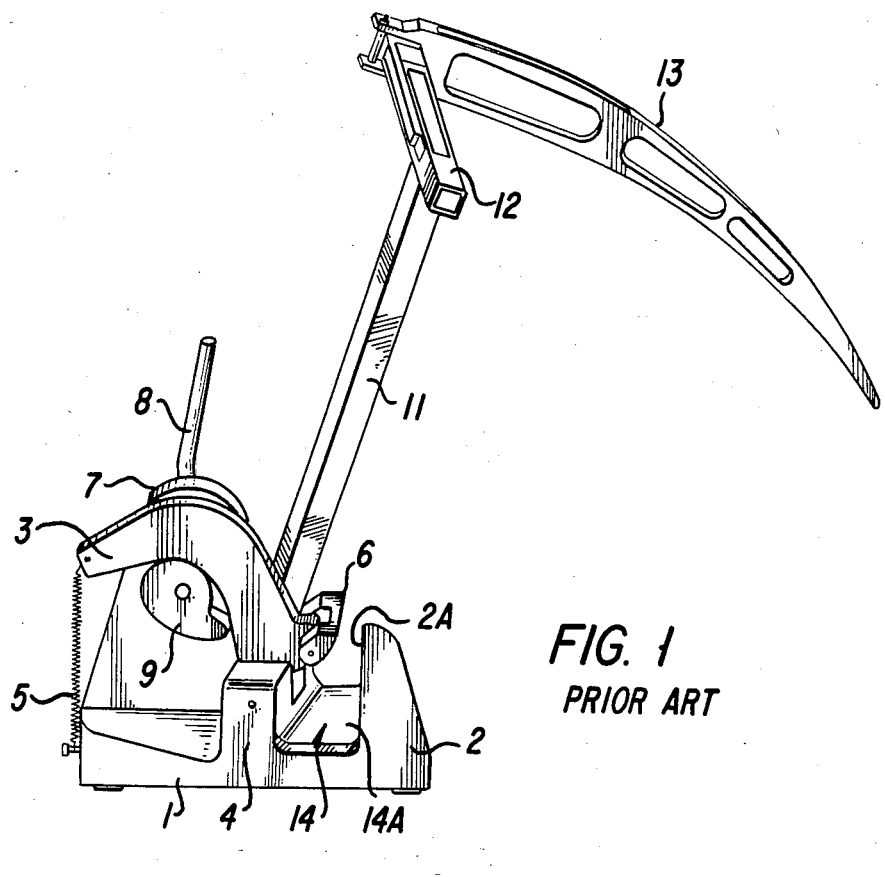
FIG. 1 is a perspective view from slightly above and to the right of a prior art golf club adjuster.
Figure 2:
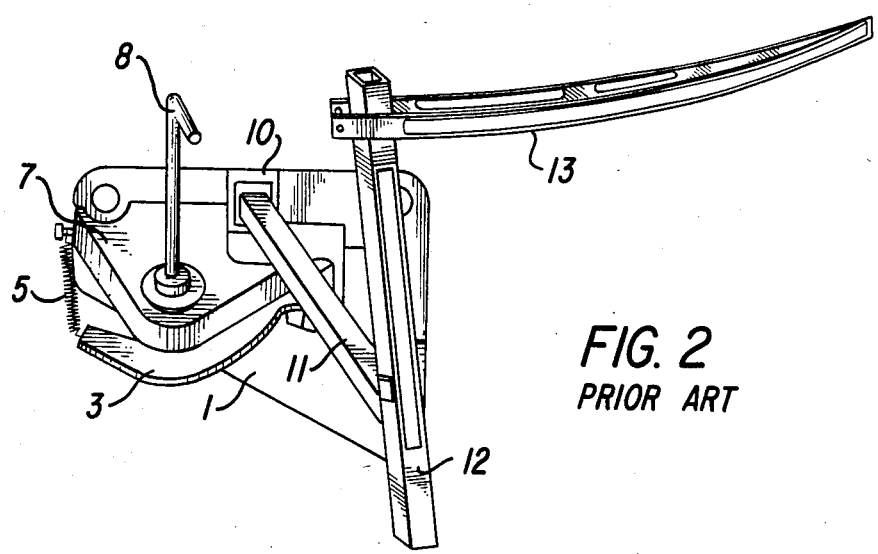
FIG. 2 is another perspective view from some distance above and slightly to the right of the prior art golf club adjuster of FIG. 1.

FIGS. 1 and 2 illustrate a prior, conventional golf club adjuster which is used to adjust the loft and/or lie angle of golf club. The golf club adjuster of FIGS. 1 and 2 employs a base 1. At the right hand end of the base 1 there is a face contact part 2 which defines a vertical club head face contacting surface 2A. Adjacent to the face contact part 2 there is a sole contact part 14 which defines a club head sole contacting surface 14A. As in the other conventional golf club adjusters the face contact surface 2A of the face contact part 2 is vertical to the base 1, while the sole contact surface 14A of the sole contact part 14 has an upward inclination of between about 30° and 35° from the front and relative to the horizontal.

To the left of the face and sole contacting parts 2 and 14, respectively, there is a clamping arm support base 4. Together, the clamping arm support base 4, the sole contact part 14 and the face contact part 2 define a channel or recess adapted to receive the head of a golf club. The face of the golf club head resides in contact with the face contacting surface 2A, while the sole or bottom of the golf club head remote from the shaft resides in contact with the sole contacting surface 14A.

A curved clamping arm 3 is rotatably mounted at the center of the clamping arm support base 4. An axle extends through the structure of the clamping arm support base 4, passing through the clamping arm 3 near one end thereof. A spring 5 is attached between the left side of the base 1 and the other end of the clamping arm 3. The spring 5 exerts a spring force to urge the clamping arm 3 in counter-clockwise rotation, as viewed in FIG. 1.

A club face press plate 6 is attached to the right end of the clamping arm 3, as viewed in FIG. 1. A cam 9 is attached to the end of a handle 8. The handle 8 is supported for rotatable movement about a horizontal axis passing through the upstanding handle base 7, which is a flange-like projection from the base 1 at the rear thereof. The handle base 7 is mounted on the left rear part of the base so that the cam 9 contacts the middle underside of the clamping arm 3.

A lie angle gauge 12 is attached to an end of the gauge support rod 11. The other end of the gauge support rod 11 is inserted into the rod base 10 which is mounted on the rear center of the base 1, as depicted in FIG. 2. A loft angle gauge 13 is attached to the lie angle gauge 12.

The conventional golf club adjuster depicted in FIGS. 1 and 2 is a typical example of the type of golf club adjusters which have been manufactured to adjust the loft and lie angle so as to make the "point" swing easier. This type of club adjuster cannot give a fulcrum to the club face. As a consequence, clubs adjusted by such prior conventional golf club adjusters are not appropriate for the "line" swing and do not impart an ideal spin to a golf ball.

Figure 3:
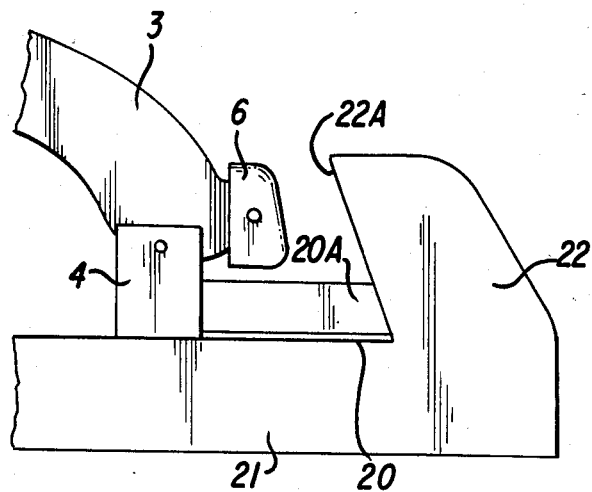
FIG. 3 illustrates an improved golf club adjuster according to the invention.

FIG. 3 illustrates an embodiment of the improved golf club adjuster of the invention. The improved golf club adjuster of FIG. 3 employs a clamping arm 3, a cam 9, a handle 8, and lie and loft angle gauges 12 and 13, respectively, as in prior golf club adjusting devices. The golf club adjuster of FIG. 3 differs from prior conventional golf club adjusters in several extremely important respects, however. The sole contact part 20 is attached to the base 21 and has a sole contacting surface 20A. The sole contacting surface 20A is a planar surface that has an inclination of from between about 20° to about 40° from the front to the rear of the base 21, as viewed in FIG. 3.

Figure 4:
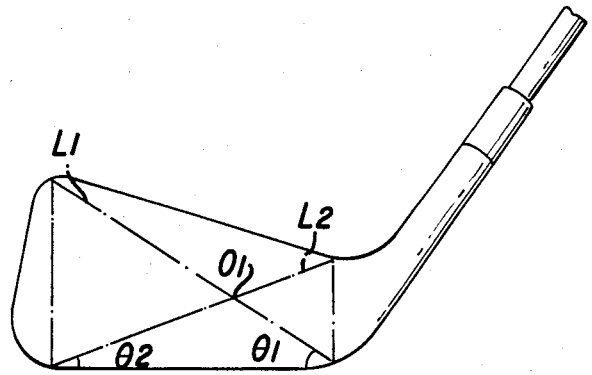
FIG. 4 illustrates a golf club head showing the location of a fulcrum as imparted by the improved golf club adjuster of FIG. 3.

The angle of the inclination of the sole contacting surface 20A is shown in FIG. 4 and is indicated as $\theta 1$. This angle is measured by drawing a line from the crown of the toe to the bottom of the heel of a golf club head. This line is indicated at L1 in FIG. 4. The angle of inclination relative to the horizontal of the sole contacting part 20A is determined by taking the angular measurement between the line L1 and the sole S of the club head. The degree of this inclination varies with individual golf club head manufacturers.

The face contact part 22 of the improved golf club adjusting device of the invention, depicted in FIG. 3, is attached to both the sole contact part 20 and the base 21. The bottom of the face contacting surface 22A of the face contact part 22 has an inclination which resides in the plane of the sole contacting surface 20A. That is, the sole contacting surface 20A and the face contacting surface 22A intersect in a straight line, and form a dihedral. The face contacting surface 22A has an inclination of from between about 5° to about 30° relative to the vertical from top to bottom.

The angle of inclination of the face contacting surface 22A is illustrated in FIG. 4 as the angle $\theta 2$. This angle is measured by drawing a line from the crown of the heel of the club face to the bottom of the toe, depicted in FIG. 4 as the line L2. The angular measurement of $\theta 2$ is ascertained by measuring the angle between the line L2 and the sole S of the club head. The degree of this inclination varies with individual club manufacturers.

FIG. 3 illustrates the clamping arm 3, the clamping arm support base 4 and the club face press plate 6. These parts, however, may be replaced with any other comparable parts or devices. Also, the gauges of loft and lie angles may be of any conventional design, such as those illustrated in FIGS. 1 and 2. The gauges of loft and lie angles are not illustrated in FIG. 3, although they are essential to a golf club adjuster according to the invention.

Adjustment of a golf club may be explained with reference to all of the drawing figures. In the prior art device illustrated in FIGS. 1 and 2, the face of a club head is positioned in contact with the face contacting surface 2A of the face contact part 2. Concurrently, the sole S of the club head is placed in contact with the sole contacting surface 14A of the sole contact part 14 which is located on the base 1 between the face contact part 2 and the clamping arm support base 4. The club press plate 6 is moved to the right and downward by the rotating movement of the clamp arm 3. The clamp arm 3 is rotated by pulling the handle 8 in a clockwise direction, as viewed in FIG. 1. The cam 9 also rotates and causes the clamp arm 3 to rotate in a clockwise direction, as viewed in FIG. 1. The club head is secured and releasably immobilized by the pressure of the club press plate 6 upon the rear part of the club head.

The head of a pipe rod, which is not shown in the drawing figures, is inserted into the neck of the shaft of the club. The loft and lie angles of the club are adjusted using the pipe rod. The gauges 12 and 13 are used to measure the adjustments.

In the club head adjuster of the invention, depicted in FIG. 3, the club head is pressed and immobilized relative to the sole contacting surface 20A and the face contacting surface 22A by the club press plate 6. The loft and lie angles of the club are adjusted by checking the loft and lie gauges. The neck of the club is twisted with the pipe rod to perform any necessary adjustments. The extent to which the neck of the club is twisted is based upon the lines L1 and L2. The crossing point O1 of lines L1 and L2 becomes the fulcrum. This fulcrum O1 is a central determining point of distance, depth and direction and is not affected by the posture with which the golfer addresses a golf ball.

Human beings perceive distance, depth and direction with the sense of sight. Likewise, in a golf swing it is possible for the player to make a "line" or oval swing and to impart a spin to the ball using centrifigal force when he realizes the central point of distance, depth and direction which is on the face of the club. When he fails to realize either distance, depth or direction, he makes a "point" swing, which is a swing in a circular arc to compensate for the failure to take into account one of the foregoing parameters.

When the club is adjusted properly to supply the correct loft and lie angles, and to provide a fulcrum point, it is easier for a player to make a "line" swing, that is a swing along an oval path, thus giving proper spin to the ball.

Undoubtedly numerous other variations and modifications of the invention will become readily apparent to those familiar with golf club adjusting devices. Accordingly, the scope of the invention should not be construed as limited to the specific embodiment of the invention depicted, but rather is defined in the claims appended hereto.

I claim:

1. In a golf club adjusting apparatus having a club head sole contacting surface and a club head face contacting surface the improvement wherein said club head sole contacting surface is generally planar and inclined at an angle between 20° and 40° relative to the horizontal and said club head face contacting surface is generally planar and inclined at an angle of between 5° and 30° relative to the vertical.

2. A golf club adjusting apparatus according to claim 1 in which said sole contacting surface and said face contacting surface intersect in a line which is inclined at an angle of between 20° and 40° relative to the horizontal.

3. In a golf club adjuster having a base for holding a golf club head which has a club head sole contacting surface and a golf club head face contacting surface, the improvement wherein said sole contacting surface is generally planar and inclined relative to the horizontal at an angle of between 20° and 40° and said face contacting surface is generally planar and inclined relative to the vertical at an angle of between 5° and 30°.

4. A golf club adjuster according to claim 3 in which said angle of inclination of said sole contacting surface is equal to the angle between the sole and a line drawn from the crown of a golf club head toe to the bottom of the golf club head heel.

5. A golf club adjuster according to claim 3 in which said angle of inclination of said face contacting surface is equal to the angle between the sole and a line drawn from the crown of the heel to the bottom of the toe.

6. A golf club adjuster comprising a base defining a planar club head sole contacting surface inclined at an angle of between 20° and 40° relative to the horizontal and a planar face contacting surface intersecting said sole contacting surface and inclined at an angle of between 5° and 30° relative to the vertical, and an upright clamping arm support, a clamping arm rotatably mounted on said clamping arm support, a club face press plate rotatably attached to one end of said clamping arm for pressing against the rear of a club head, whereby rotation of said clamping arm in one direction presses a club head into contact with said sole contacting surface and said face contacting surface.

* * * * *